Oct. 29, 1957        G. R. NELSON        2,811,066
INERTIA INFLUENCED, PRE-DETERMINED TORQUE RELEASE WRENCH
Filed July 5, 1955        6 Sheets-Sheet 1

INVENTOR.
Gorman R. Nelson
BY
Sam J. Slotsky
ATTORNEY

Oct. 29, 1957        G. R. NELSON       2,811,066
INERTIA INFLUENCED, PRE-DETERMINED TORQUE RELEASE WRENCH
Filed July 5, 1955        6 Sheets-Sheet 2

INVENTOR.
Gorman R. Nelson
BY
Sam J. Slotsky
ATTORNEY

Oct. 29, 1957   G. R. NELSON   2,811,066
INERTIA INFLUENCED, PRE-DETERMINED TORQUE RELEASE WRENCH
Filed July 5, 1955   6 Sheets—Sheet 3

INVENTOR.
Gorman R. Nelson
BY
Sam J. Slotsky
ATTORNEY

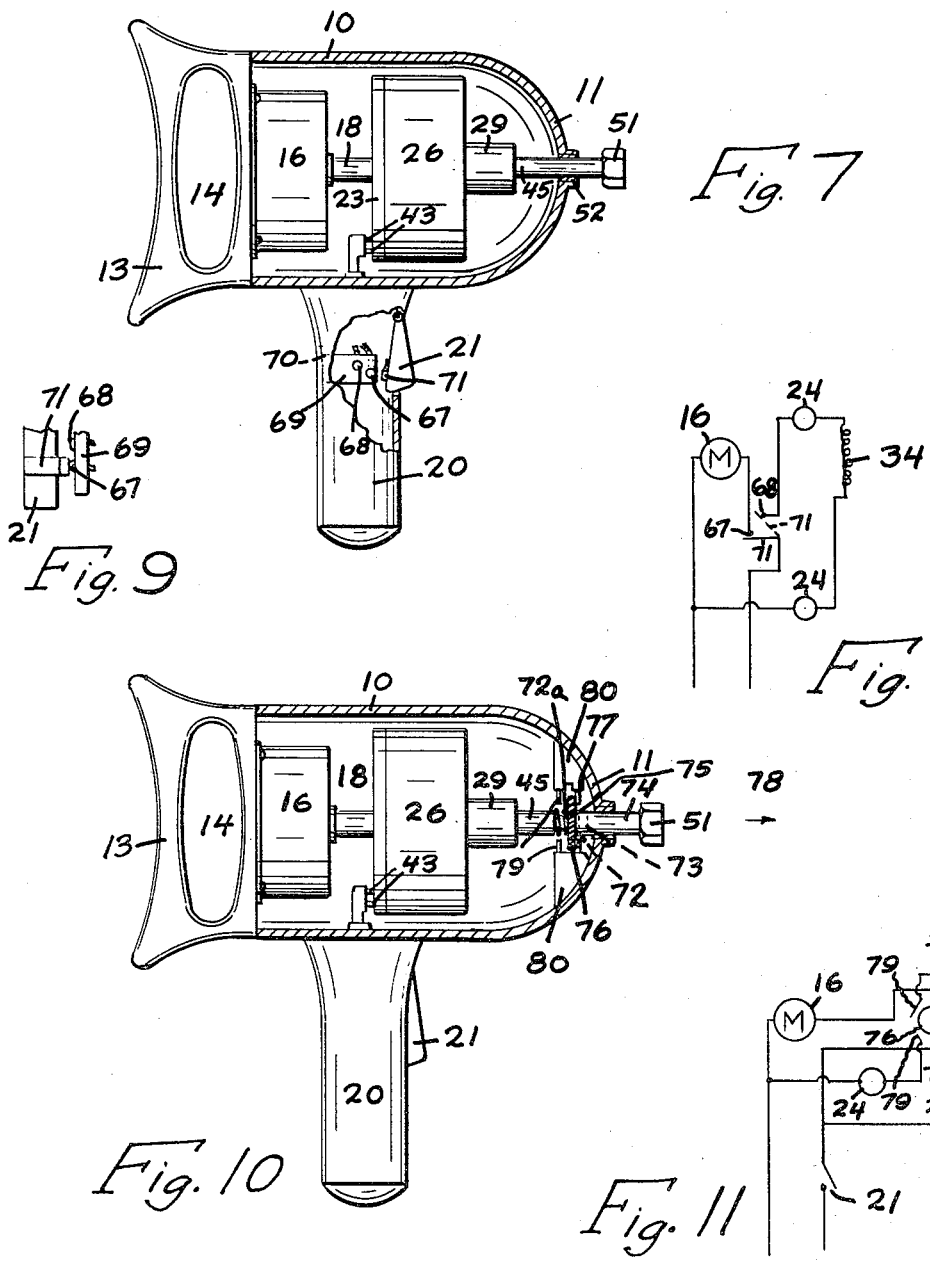

Oct. 29, 1957      G. R. NELSON      2,811,066
INERTIA INFLUENCED, PRE-DETERMINED TORQUE RELEASE WRENCH
Filed July 5, 1955      6 Sheets-Sheet 5

INVENTOR.
Gorman R. Nelson
BY
Sam J. Slotsky
ATTORNEY

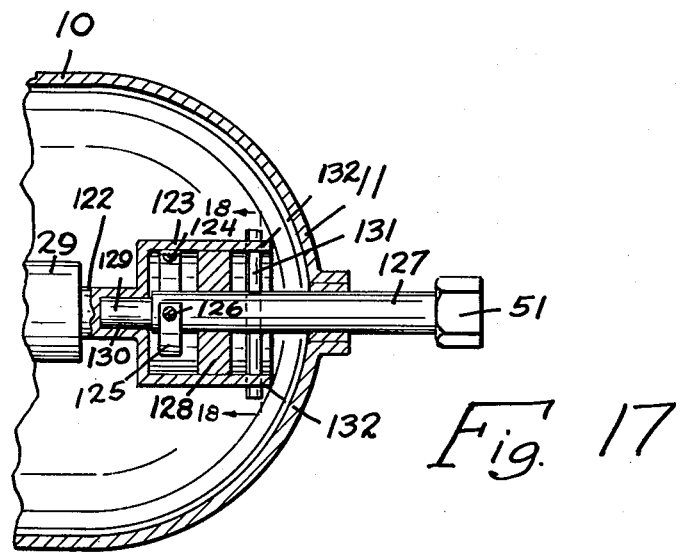
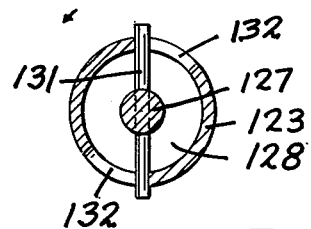

United States Patent Office 2,811,066
Patented Oct. 29, 1957

2,811,066

INERTIA INFLUENCED, PRE-DETERMINED TORQUE RELEASE WRENCH

Gorman R. Nelson, Sioux Falls, S. Dak.

Application July 5, 1955, Serial No. 519,996

3 Claims. (Cl. 81—52.4)

My invention relates to a torque wrench.

An object of my invention is to provide a torque wrench which will apply torque to a nut or other similar device and to provide a practical arrangement for running up nuts, bolts, etc., or other arrangements, to which the tool may be applied.

A further and important object of my invention is to provide means for reducing the recoil torque on the tool.

A further object of my invention is to provide means whereby the tool can be readily adjusted to accommodate different size nuts and the like.

A further object of my invention is to provide a small torque motor or other suitable device which will establish sufficient torque to a further device coupled therewith for the above purposes, and to also provide means whereby the tool can be conveniently operated, with suitable switch members incorporated therewith for providing a practical tool consistent with the requirements of the operator thereof.

A further object of my invention is to provide a magnetic clutch device usable in combination with the tool.

With these and other objects in view, my invention consists in the construction, arrangement, and combination of the various parts of my device whereby the objects contemplated are attained, as hereinafter more fully set forth, pointed out in my claims, and illustrated in the accompanying drawings, in which:

Figure 7 is a modification showing the use of a double detent switch,

Figure 12:
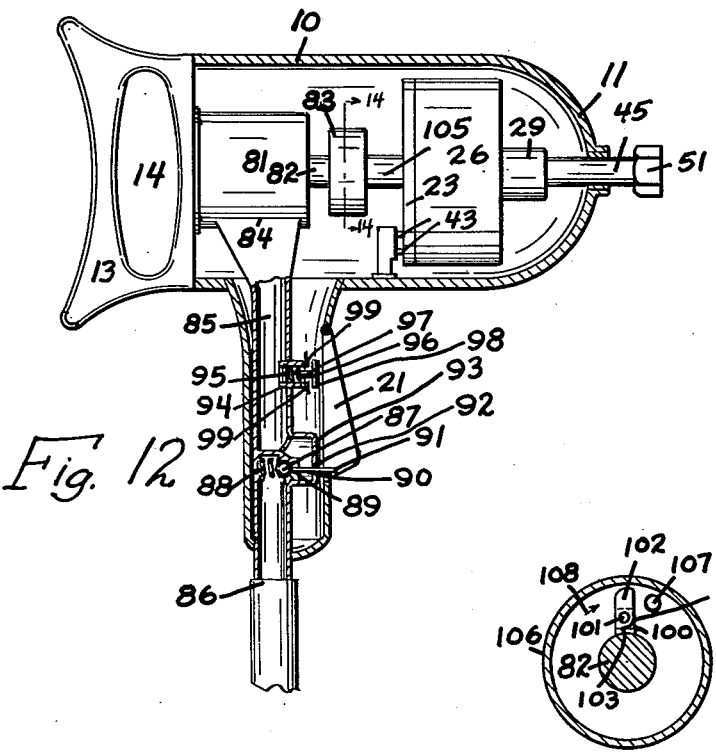
Figure 13:
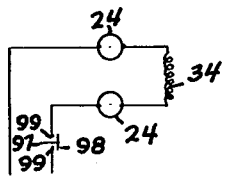
Figure 14:
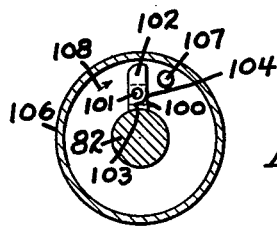
Figure 15:
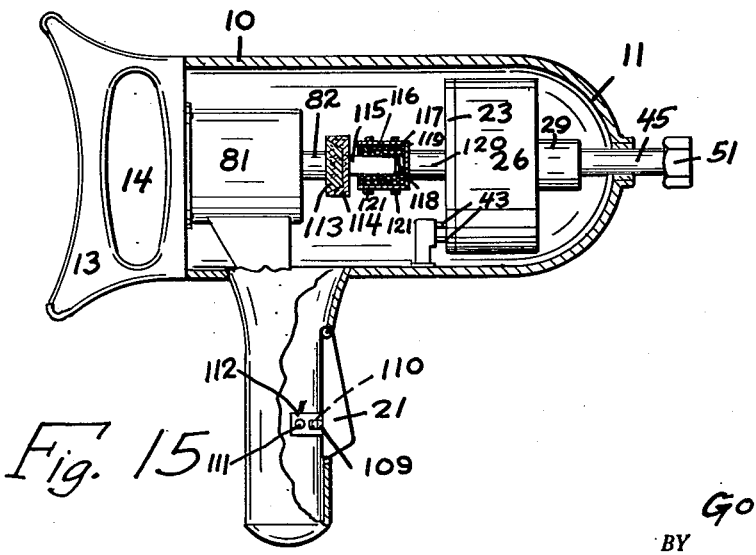
Figure 16:
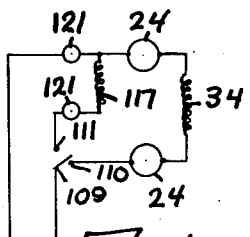

Figure 8 is an electrical circuit diagram of the modification shown in Figure 7, Figure 9 is a detail of the switch of Fig. 7, Figure 10 is a further modified form of device, Figure 11 is an electrical circuit diagram of the modification shown in Figure 10, Figure 12 is a further modification showing the device as used with an air motor, Figure 13 is an electrical circuit diagram of the modification shown in Figure 12, Figure 14 is an enlarged sectional view taken along the lines 14—14 of Figure 12, Figure 15 is a still further modification of the air motor type of device, Figure 16 is a further electrical circuit diagram of the modification shown in Figure 15, Figure 17 is a detail of a modification, and Figure 18 is a sectional view of Figure 17, taken along the lines 18—18 thereof.

My invention contemplates the provision of a torque wrench in which a relatively small torque motor or similar device is coupled to a clutch device having a relatively much larger inertia, the clutch device including certain characteristics rendering the tool conveniently operable by an operator, and with the small torque motor, etc., thereby providing means whereby the recoil torque on the output shaft cannot be transferred back to the operator.

I have used the character 10 to indicate a cylindrical hollow body having the forward arcuate portion 11, the member 10 merging integrally at 12 with a handle portion 13, which portion 13 includes the opening at 14 for inserting the fingers therein, the character 15 indicating a switch of any suitable type which is adapted to open or close the motor circuit, the character 16 indicating a small electric motor suitably attached at 17, the motor 16 being carried within the housing 10. Since the circuit of the motor 16 is relatively simple, it is not necessarily shown in the schematic diagrams herein. The motor 16 is a relatively weak motor having very low torque and drives the shaft 18. Secured to the body 10 at 19 is the handle 20 including a switch 21.

Attached to the shaft 18 at 22 is the insulated disc 23 in which disc are imbedded the annular conducting rings 24, the shaft being also attached to a further magnetically permeable disc member 25 which merges integrally with the cylindrical portion 26 which is attached at 27 to the further magnetically permeable disc 28 which is secured to the hub 29 which includes the bearing members 30 and 31, the bearing 30 including a seal at 32, and also attached to the disc member 25 is a further magnetic member 33 between which member and the member 25 is wound an electrical coil 34. Secured within the member 33 at 35 is a disc-shaped resilient member 36 having the slit at 37 for permitting excess gas to escape, etc., and attached within the member 26 are the brass inserts 38 between which inserts are clamped the annular disc-shaped members 39, the character 40 designating further inserts which are adapted to secure the further disc or annular members 41 which are thereby spaced from the members 39, and enclosed within the casing thus formed is a magnetic medium 42 which is in the form of an oil in which magnetic particles are immersed, or which can be in the form of a dry powder made up of iron particles if such is desired.

The members 39 and 41 can be made of a magnetic material or otherwise, and the foregoing construction is more completely disclosed in my co-pending applications on a Recoil Reducing Device for Magnetic Fluid Variable Torque Wrench, Serial No. 420,654, now Patent No. 2,762,248 issued Sept. 11, 1956; and Magnetic Fluid Variable Torque Wrench, Serial No. 446,893, now abandoned and in issued Patent #2,687,054, issued August 24, 1954, on a Magnetic Fluid Variable Torque Wrench, these devices pertaining to clutch arrangements which develop the maximum torque when the coil 34 is energized, and when the coil is not energized, will exert a torque consistent only with the viscous drag thereof.

The characters 43 indicate a pair of brushes which feed the electrical current to the annular bars 24, and it should be understood that the current can be varied by means of a rheostat or other arrangement so that the input current to the magnetic clutch can be varied to apply different pre-set torques at which the clutch will operate, it being understood throughout the specification that the term "magnetic clutch" will refer to the arrangement just described.

Clamped to the inserts 40 by means of the large nut 44 is a further shaft 45 to which is attached the pin 46, the pin 46 being slidable within the slots 47 which are cut-out of the hollow cylindrical member 48 which includes a compression spring 49 therein against which the shaft 45 bears, the member 48 being secured to a still further shaft 50 to which is secured the nut-engaging member 51 or any other somewhat similar member, the character 52 indicating a bearing.

For the sake of convenience in explaining the operation, the member 48, spring 49, pins 46, etc., will be referred to as the "positive clutch."

Figure 1:
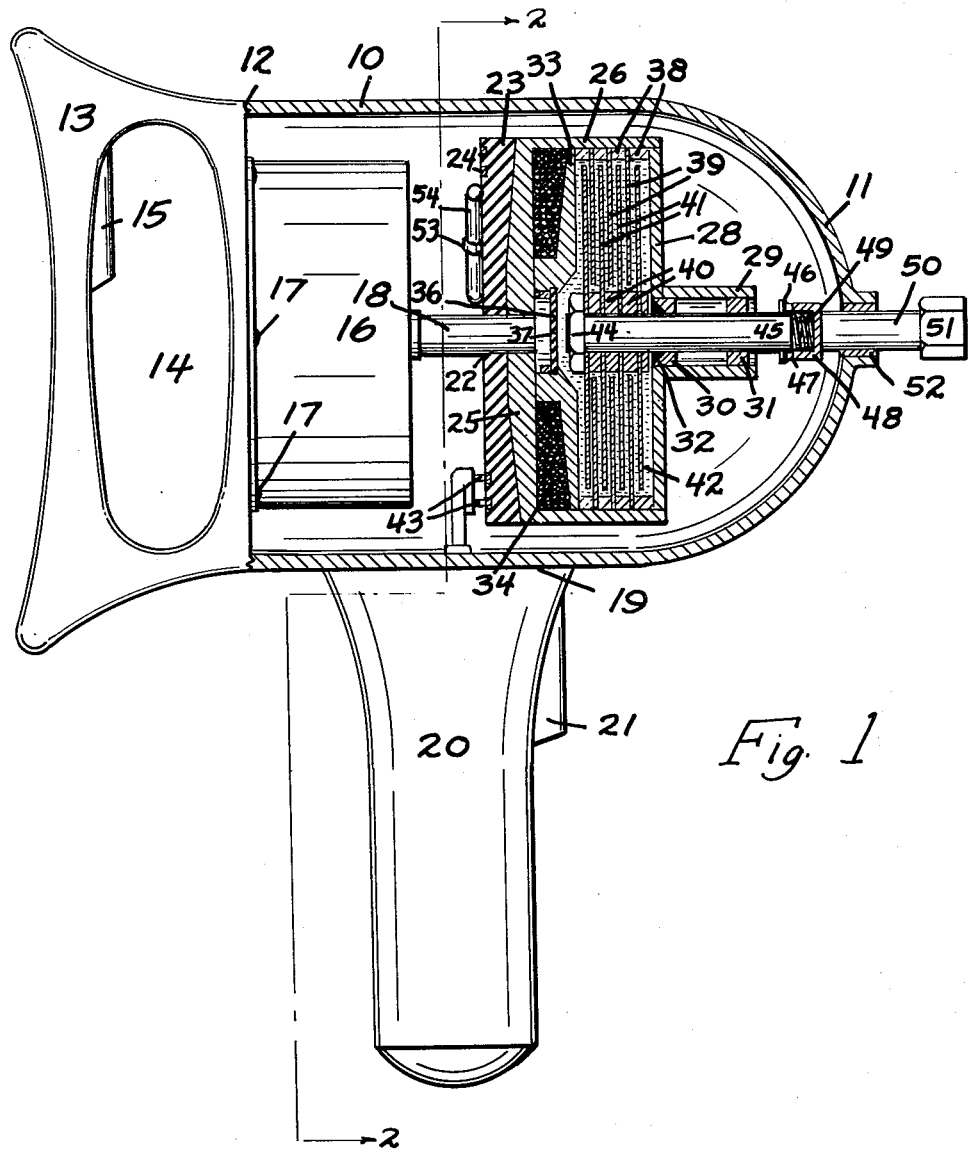
Figure 1 is a partially sectional view taken along the axis of the tool.
Figure 2:
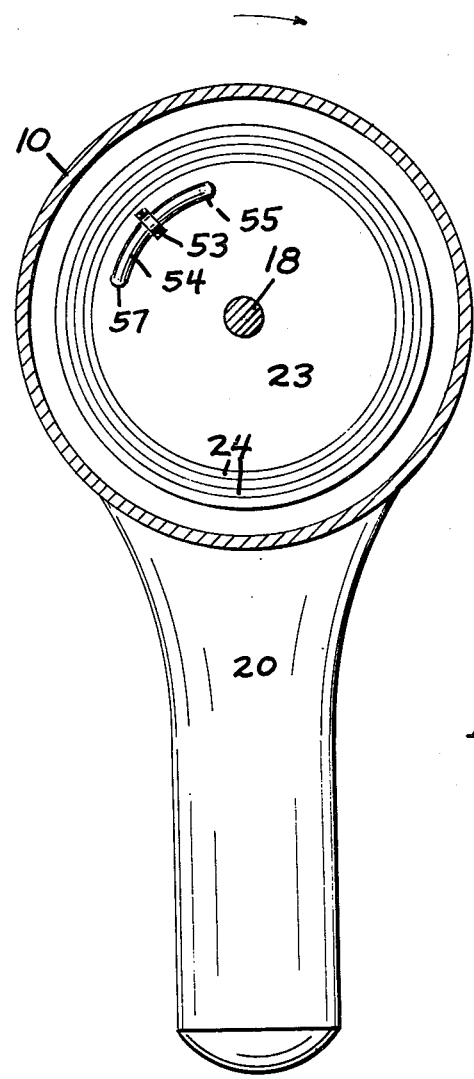
Figure 2 is a sectional view of Figure 1 on line 2—2 with the brush structure being omitted.
Figure 3:
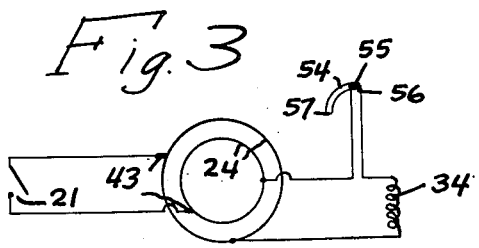
Figure 3 is an electrical circuit diagram.

Attached by means of a small clamp 53 to the disc 23 is a hollow arcuate glass tube 54 which is closed at both ends, and which includes a small globule 55 (see Figure 2) of mercury therein, the mercury being adapted at certain conditions to provide a contact at 56 to the circuit shown in Figure 3 and as will be explained. The tool is operated in the following manner.

The socket 51 is engaged with a nut which is to be driven up to a pre-set torque, and the positive clutch (members 48, 49, etc.) is disengaged, namely, the operator backs up slightly on the tool. The switch 15 is then depressed, which starts the motor 16. The motor 16 is sufficient only to bring the magnetic fluid clutch (plates 39, 41, and magnetic fluid) to full speed in a practical and reasonable length of time, such time being relatively short and yet sufficient for the purpose intended. Next, the operator closes the switch 21 which thereby applies electrical excitation through the brushes 43 to the coil 34, and the operator then exerts a slight pressure toward the socket, which engages the positive clutch. At this point the mercury 55 will be at the end 57 of the tube 54 and will be maintained at this position by virtue of centrifugal action, and the circuit will not be closed to the coil 34. Therefore, the residual, minimum, or non-excitation drag is now applied to running up the nut. As soon as the nut is seated, however, this drag is overcome, causing deceleration in the speed of the magnetic fluid clutch, and as soon as this deceleration occurs, the mercury will instantly occupy the upper position shown in Figure 2, thereby closing the circuit and thereby applying full pre-set excitation to the magnetic fluid clutch. As soon as slippage occurs under full pre-set torque which will be readily apparent, the switch 21 is opened or released, which opens the circuit, and the tool is then removed from the nut, which also thereby disengages the positive clutch, at which point the motor accelerates the magnetic fluid clutch and is ready for the next application to the next nut.

The small torque motor 16 exerts a relatively small recoil torque in accelerating the magnetic fluid clutch to full speed under residual, or non-excitation drag conditions. As excitation is applied, the kinetic energy stored in the magnetic fluid clutch is applied to the output shaft. The torque exerted on the output shaft is determined by the pre-set excitation. The maximum torque available at the output of the clutch is determined by the formula $T = I \times \alpha$ where T is torque, I is moment of inertia, and $\alpha$ is acceleration.

It is important to note that the only connection between the output torque and the motor frame, or handle of the tool, is the maximum torque of the motor, which being small, exerts only a small recoil torque on the operator, so that regardless of the amount of recoil torque applied back to the magnetic fluid clutch, such torque cannot be transferred through the frame or handles by virtue of the above fact that the small torque motor can only exert a small recoil torque.

Figure 4:
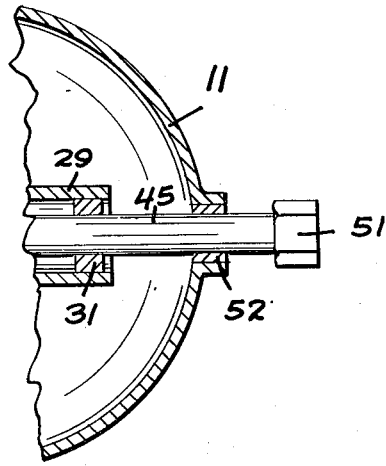
Figure 4 is a detail of a modification.

Figure 4 illustrates a modification wherein the positive clutch may be omitted, and wherein the shaft 45, for instance, continues directly to the socket 51. This clutch may be omitted if the residual non-excitation drag is low enough to enable the motor 16 to bring the magnetic fluid clutch to maximum speed, with the output shaft, or nut-engaging shaft, stationary. Also, the deceleration switch which comprises the tube 54, mercury 55, etc. may be omitted if the residual drag is such that the magnetic fluid clutch speed under no excitation will be maintained with the output shaft stationary.

Figure 5:
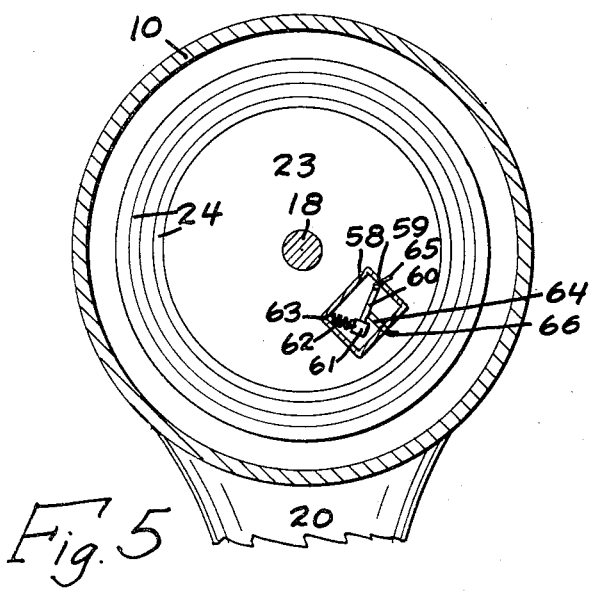
Figure 5 is a detail of a further modification.
Figure 6:
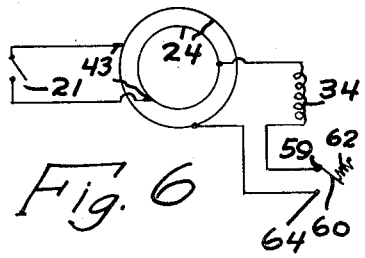
Figure 6 is a further electrical circuit diagram.

In a further form, if it is desired to apply a repetitive torque to the nut, then a velocity switch as shown in Figure 5 may be used. This velocity switch is a small unit which is enclosed within a box 58 which is secured to the disc 23, and pivoted within the box at 59 is a contact bar 60 to which is attached a weight 61 which is attached to a coiled tension spring 62 which is attached at 63 to the box 58, the bar 60 making contact with the contact member 64, the contacts being established through the leads 65 and 66, and in this modification the switch members 54, 55, etc. are not used. In this latter modification in assuming that the switch 21 is closed, and that the positive clutch is engaged, and further assuming that full pre-set torque is being applied to the nut, when the deceleration of the magnetic fluid clutch reaches any predetermined velocity, due to such deceleration, the switch bar 60 will be pulled away from the contact 64 thereby opening the switch and removing the excitation torque, enabling the motor 16 to accelerate the magnetic fluid clutch, and when the magnetic clutch velocity increases sufficiently, the acceleration switch, or bar 60, will close with contact 64, again applying the full torque to the output shaft, Figure 6 illustrating the schematic electrical diagram in this latter arrangement.

Figures 7 to 16 inclusive illustrate further modifications which will now be described, it being understood that similar characters already described will indicate similar parts.

Figure 7 illustrates a form of the device in which the switch 54 is not used, nor the velocity switch 60, and in this modification only the trigger member 21 is used, this trigger member being adapted to operate a double detent switch comprising the contact members 67 and 68, which are secured to the insulated bracket 69 which is suitably secured at 70 within the handle 20, one of the leads of the circuit passing to a contact member 71 which is adapted to contact either of the contacts 67 or 68. It will be clearly noted that when contacting the first contact member 67, the electrical energy will be applied to the motor 16 which brings the magnetic clutch up to speed, and next, when contact is established to the contact point 68, the circuit is opened to the motor and closed to the excitation coil 34 of the magnetic clutch, thereby providing a further modified form of the arrangement. It will thus be noted from this construction that a similar result is effected, namely, that of starting the small torque motor and thence applying excitation to the magnetic clutch and breaking the circuit to the motor, thereby providing similar results to that above described.

Figures 10 and 11 illustrate a still further modification in which the switch 21 is merely a simple single pole type as shown in the wiring diagram Figure 11 and wherein the shaft 45 includes a squared portion 72 adapted to slide within a further hollow square portion 73 within a further shaft portion 74 which is secured to the socket 51. Attached to the shaft portion 74 is the insulating member 75 to which is attached the annular conducting ring 76 which bears against the brushes 77. Surrounding the shaft portion 72 is the spring 72a. In this modification, when a slight pressure is applied in the direction of the arrow 78 or when the tool is being engaged with the nut, even though the switch 21 is depressed to close the circuit, the circuit will be opened at the brushes 77 due to the slight pressure, and the conducting ring 76 will then contact the further brushes 79, thereby opening the circuit to the motor 16 and closing the circuit to the excitation coil 34 (see Figure 11), the character 80 designating suitable brush holders.

Figures 12 to 16 inclusive illustrate modifications wherein an air motor is used in combination with the magnetic clutch. In this form of device, the character 81 will indicate an air motor having the shaft 82, the character 82 indicating generally an over-running clutch. Communicating with the air motor 81 at 84 is the conduit or hollow pipe 85 which is attached at 86 to a suitable source of air pressure, this conduit including a small ball valve 87 bearing against the spring 88, the ball valve being secured at 89 to the rod 90, which is secured at 91 to the switch 21, the rod 90 passing snugly through the opening 92 in the wall portion 93 of the conduit 85, and also attached within the conduit 85 is the cylindrical member 94 having the closely fitted movable piston 95 bearing against a spring 96, and attached to the piston 95 is the rod 97 which is secured to the contact member 98 adapted to contact the contacts 99. The over-running clutch can be of any suitable type in which the driven member when rotating faster than the driving member will continue to rotate, Figure 14 showing one type of the same in which attached to the shaft 82 is the ear 100 to which is pivoted at 101 the pawl 102 having the shoulder 103 and rounded portion 104, and attached to the further shaft 105 (see Figure 12) which in all respects is the same as shaft 18 above described, is the casing member 106 to which is attached the pin 107. It will be noted that when the motor shaft 82 rotates in the direction of the arrow 108 the pawl will bear against the pin 107 carrying the magnetic clutch around, however, as soon as the magnetic clutch attains a greater speed or when the air motor 81 ceases to rotate, the pin 107 will contact the pawl 102 at the rear thereof, having no effect thereon due to the curvature at 104. Air motors usually have certain characteristics wherein they will cease rotation rather abruptly, this arrangement thereby providing for this contingency. In this type of device when the air pressure is being applied to the motor 81 as long as there is air pressure in the conduit 85, or in other words, when the member 21 has been depressed allowing the air pressure to pass through the ball valve 87 and into the upper part of the conduit 85, this pressure will cause the piston 95 to be forced to the right as viewed in Figure 12 with the contacts 99 being open. When the trigger 21 is released, however, the air pressure in the upper portion of the conduit will drop whereby the spring 96 will force the piston 95 to the left, and the contacts 99 will close the circuit to the excitation coil, and as air power is again supplied to the motor 81 the pressure switch again removes the excitation from the magnetic clutch permitting the system to reach maximum velocity without any recoil torque being felt.

A still further form is shown in Figures 15 and 16 in which the finger switch 21 includes a contact member 109 connected into the circuit as shown in Figure 16, the contact member 109 being adapted to contact the contacts 110 and 111 which are mounted on the insulated base 112, these further contacts being connected into the circuit as shown, the character 113 indicating the male portion of a clutch having the female portion 114, the portion 114 including the square portion 115 slidably received within the square cavity 116, the character 117 indicating a solenoid which is connected into the circuit as shown, the end of the member 115 bearing against the spring 118, the solenoid 117 being received within the housing 119 which is secured to the shaft 120, which shaft is analogous to shaft 18 above described. The character 121 indicates a pair of insulated conducting rings connected into the circuit as shown. By virtue of this particular arrangement it can be assumed that the air motor is controlled by means of any suitable type of valve. It will be noted that when the contacts 109 and 110 are established, the contacts 109 and 111 will be broken, whereby the solenoid 117 will not function, and in this way power from the air motor will be applied to the magnetic fluid clutch 26 etc. However, when the contacts 109 and 111 are established to the solenoid 117, the circuit will be broken to the excitation coil 34, the solenoid 117 drawing the clutch faces 113 and 114 apart so that no torque can then be transmitted from the air motor 81 to the output shaft 45, this arrangement thereby providing the desired result.

Figures 17 and 18 illustrate a further modification in which the character 122 indicates the shaft corresponding to shaft 45 in certain of the other modifications, or the shaft which is driven by the magnetic clutch, this shaft continuing into the expanded cylindrical portion 123 to which is attached at 124 a coiled spring 125 which is attached at 126 to the output shaft 127 which is attached to the socket 51.

Attached within the portion 123 is the bearing 128 in which is rotatably received the shaft 127, the shaft 127 further including the reduced portion 129 which is received within the cylindrical socket 130.

Passing through the shaft 127 is the pin 131, which pin is also received within the slots 132, the slots 132 being formed within the cylindrical member 123, these slots being substantially of the length of a 45° arc.

The purpose of this particular device, which can be used on any of the other torque wrenches heretofore described, is to interpose a shock absorbing system between the input shaft and the output shaft, the input shaft in the present case referring to shaft 122 and the output shaft being shaft 127. This device will absorb the small inertia effect of the rotor of the clutch, which device must abut against the solid stop so that the full inertia of the clutch can be applied through the device. For instance, when running up a nut, as soon as the nut is tightened against a solid surface, the momentum would be at a maximum, the present spring-loaded device serving to absorb the shock by virtue of the spring 125, and immediately after, when the pins 131 abut against the ends of the slots 132, the full inertia of the clutch will be applied. By virtue of this device also, the error in pre-setting a pre-determined torque which is introduced by the erratic effect of the rotor inertia is eliminated. It should be understood also that other types of spring-loaded arrangements having the same general principles could be used as well.

A further modification in which the torque is built up by use of a single plate revolving in a magnetic medium and in which this lesser torque is transmitted to a series of many plates is described in my co-pending application entitled, "Recoil Reducing Device for Magnetic Fluid Variable Torque Wrench," Serial No. 420,654, filed April 2, 1954, now Patent No. 2,762,248 issued Sept. 11, 1956.

Although several types of my inertia wrench have been described herein, it should be specifically understood that a great many other modifications could be devised without departing from the essential spirit and principles of my invention as explained hereinabove.

It will now be seen that I have provided the advantages mentioned in the objects of my invention, with various other advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. An inertia wrench comprising a nut-engaging shaft, a clutch attached to said nut-engaging shaft, a motor driving said clutch, said clutch comprising a plurality of spaced annular members, a magnetic medium co-acting with said annular members, means for energizing said magnetic medium including an electric coil, means for passing electric current through said coil, means for varying said electric current, a switch member mounted on said clutch through which electric current passes to said coil, said switch member being adapted to close said circuit at a pre-determined reduction in velocity of said clutch.

2. An inertia wrench comprising a nut-engaging shaft, a clutch attached to said nut-engaging shaft, a motor driving said clutch, said clutch comprising spaced annular members, a magnetic medium co-acting with said annular members, means for energizing said magnetic medium including an electric coil, means for establishing a circuit to said coil incidental upon breaking of the circuit to said motor.

3. An inertia wrench comprising an output shaft, a clutch attached to said output shaft, a motor for driving said clutch, said clutch comprising spaced annular magnetic members, a magnetic medium co-acting with said annular magnetic members, means for energizing said magnetic medium including an electric coil, means for de-energizing said motor, and means for applying an excitation current to said coil after said motor is de-energized.

References Cited in the file of this patent

UNITED STATES PATENTS

| 1,883,164 | Vassakos | Oct. 18, 1932 |
| 2,068,745 | Hall | Jan. 26, 1937 |
| 2,102,002 | Hill | Dec. 14, 1937 |
| 2,111,280 | Connell | Mar. 15, 1938 |
| 2,536,319 | Slack | Jan. 2, 1951 |
| 2,543,979 | Maurer | Mar. 6, 1951 |
| 2,687,054 | Nelson | Aug. 24, 1954 |